Patented Aug. 5, 1930

1,772,258

UNITED STATES PATENT OFFICE

CHARLES JOSEPH MICHEL MARIE LE PETIT, OF PARIS, FRANCE, ASSIGNOR, BY MESNE ASSIGNMENTS, TO ROHM AND HAAS COMPANY, OF PHILADELPHIA, PENNSYLVANIA, A CORPORATION OF DELAWARE

PROCESS FOR UNHAIRING AND PREPARING HIDES FOR TANNING

No Drawing. Application filed July 7, 1925, Serial No. 42,085, and in France April 18, 1925.

This invention has for its object a new process for unhairing, without destruction of the hair, and preparing hides for mineral or vegetable tanning.

This process is essentially characterized by the application for unhairing and treating hides of the direct action of the group of fungi of the genus *Mucor mucedo* and of ferments such as lipases, proteases, mucleases and cytases, such as they are produced by the group of fungi of the genus *Mucor mucedo*, and more particularly by the *Aspergillus niger* and the different varieties of Penicilliums, particularly *Penicillium glaucum*, in a specially suitable medium.

The new process comprises therefore:

1. The preparation of a nutrient medium containing starches, proteins and such mineral salts as are known to facilitate the growing of fungi.
2. The sowing of this mash with the selected mucors.
3. A period of development during which the enzymes and the spores of the mucors are produced in sufficient quantity and the mass brought to a suitable condition.
4. The application of the product thus obtained for the treatment of hides after a preparation to facilitate the action of the product has been applied.

In order that the invention may be clearly understood, it will be indicated now in detail how it can be carried out.

The first operation, as already stated, consists in the preparation of the mash where the ferments can develop. This mash is composed of ripe seeds or tubers or the like or of portions of the same that are rich in themselves in diastasic elements, such as bran, potato flour, maize, castor-oil bean, soja, flax, cotton, etc., these seeds must preferably be ripe; they are ground and, optionally, the oil can be extracted therefrom. The nutrient medium is composed of the products of grinding cereals, such as bran, potato flour, soya bean, oil cake, etc., and is mixed with about its own weight of water in such a way as to obtain a pasty mass.

Preferably this mash or must is previously enriched with substances capable of subsequently facilitating the culture of the mucors.

For that purpose, the mash or must, after or before fermentation can be improved as a medium favourable for these cultures by the addition, in the proportion of about 1 per 1000 of substances such as phosphate of potassium, magnesium chloride, calcium carbonate, etc.

A portion of the mash or must can be particularly reserved for the special culture of the *Aspergillus niger* and, for that purpose, four tenths of one per cent of zinc sulphate will be added to this mash or must.

Finally, and while it continues, this fermentation may be facilitated and activated by the use of mineral catalyzers: manganese and cerium salts, in minimum quantities for instance and preferably manganous or cerous acetate in the proportion of 0,10 to 0,25 per 1000 for instance are useful for this purpose.

This mash is seeded by mixing in a weak suspension of spores of the above mentioned fungi in water.

These cultures are left to develop during one or more days until the various proteolytic enzymes have been secreted by the fungi.

Instead of adopting the mode of procedure which has just been described, the preparation of the fermentable mash can be accelerated and the modus operandi simplified by proceeding as follows:

As an example, I shall describe the preparation of a mash suitable for the purposes here intended. 100 parts of wheat bran and 100 parts of water, containing $\frac{1}{10}$% of a mixture of ammonium, potassium, calcium and magnesium salts, are sterilized by heating in a sterilizer for thirty minutes. After cooling this mash, one part of water, in which 3 ounces seed spores are suspended, is mixed with the mash, which is then spread on trays in a thickness of 2 to 3 centimeters. It is then left for three days for the fungi to develop and grow throughout the mass.

After these various operations, the product forming the subject matter of the invention is employed for unhairing and preparing hides for the subsequent operations of tanning as indicated hereafter.

The hides adapted to be treated are previously immersed in an alkaline solution which ensures the proper swelling of their epiderm. This solution may contain 3 or 4 kilograms of caustic soda (100%) per 1000 liters of water. The hides are subsequently neutralized with bicarbonate of soda; in the case of soda, or preferably, with ammonia in the case of acids, then washed till neutral. "Neutralize" in this case is meant in the tanner's sense that the swelling due to the caustic soda is brought down and the skins caused to "fall".

The hides are then treated with the new product, either in a concentrated condition, or diluted to contain four parts per 1000 liters for attenuating its activity.

In the case of suspension in a liquid medium, the temperature of this medium can be maintained in the neighborhood of 25 to 36° C.

The hides are then ready to be subjected to the unhairing operation and preparation for tanning.

After the treatment and subsequent unhairing, the hides, before tanning will be washed and fleshed.

I claim:

1. In the process of unhairing and bating hides the step of subjecting them to the action of the enzymes of *Mucor mucedo* in a culture of said mold.

2. In the process of unhairing and bating hides the step of subjecting them to the action of the enzymes of *Aspergillus niger* in a culture of said mold.

3. In the process of unhairing and bating hides and skins the step of subjecting them to the action of the enzymes of *Penicillium glaucum* in a culture of said mold.

The foregoing specification of my "process for unhairing and preparing hides for tanning" signed by me this 29th day of April, 1920.

CHARLES JOSEPH MICHEL MARIE LE PETIT.